2 Sheets--Sheet 1.

M. K. LEWIS.
Harvesters.

No. 156,487.  Patented Nov. 3, 1874.

Witnesses.
E. H. Bates
Robert Everitt

Inventor.
Miles K. Lewis,
Chipman Hosmer & Co.,
Attys.

2 Sheets—Sheet 2.
M. K. LEWIS.
Harvesters.
No. 156,487. Patented Nov. 3, 1874.
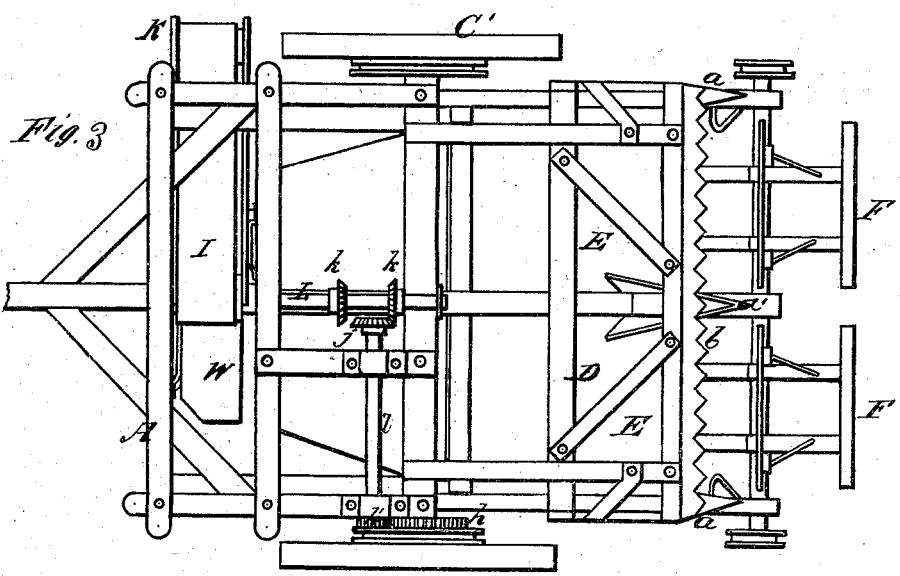
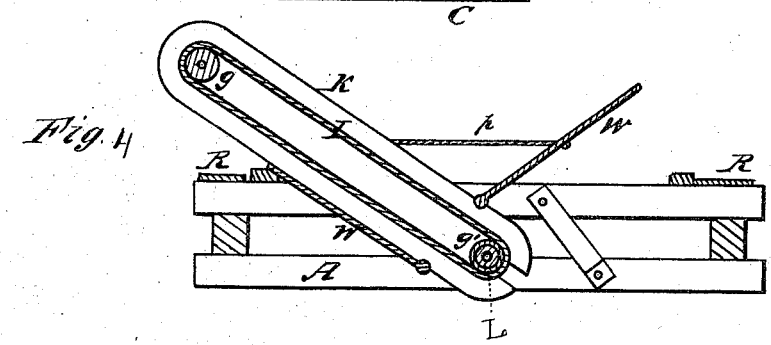
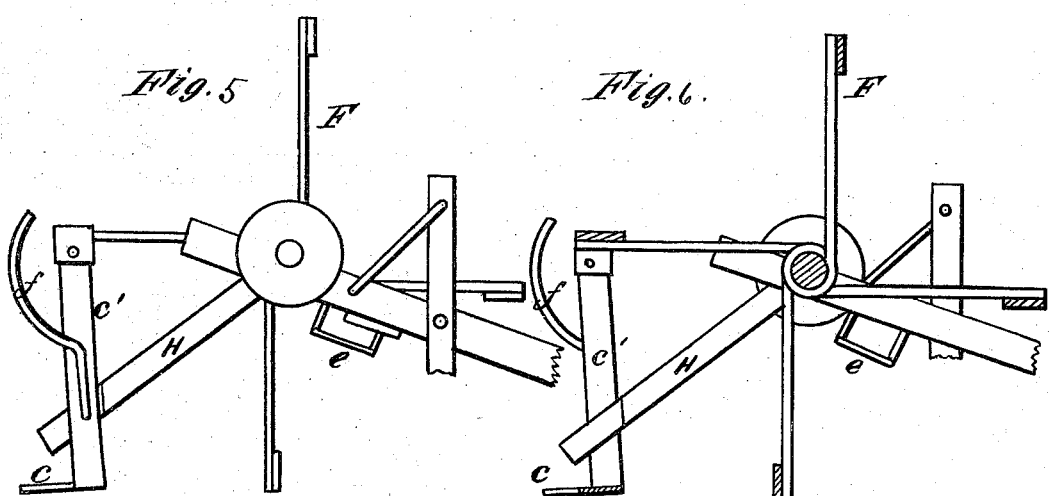
Witnesses.
E. H. Bates
Robert Everitt
Inventor.
Miles K. Lewis,
Chipman Hosmer & Co.
Attorneys.

UNITED STATES PATENT OFFICE.

MILES K. LEWIS, OF HASTINGS, NEBRASKA.

IMPROVEMENT IN HARVESTERS.

Specification forming part of Letters Patent No. 156,487, dated November 3, 1874; application filed May 2, 1874.

*To all whom it may concern:*

Be it known that I, MILES K. LEWIS, of Hastings, in the county of Adams and State of Nebraska, have invented a new and valuable Improvement in Reapers and Headers; and I do hereby declare that the following is a full, clear, and exact description of the construction and operation of the same, reference being had to the annexed drawings making a part of this specification, and to the letters and figures of reference marked thereon.

Figure 1:
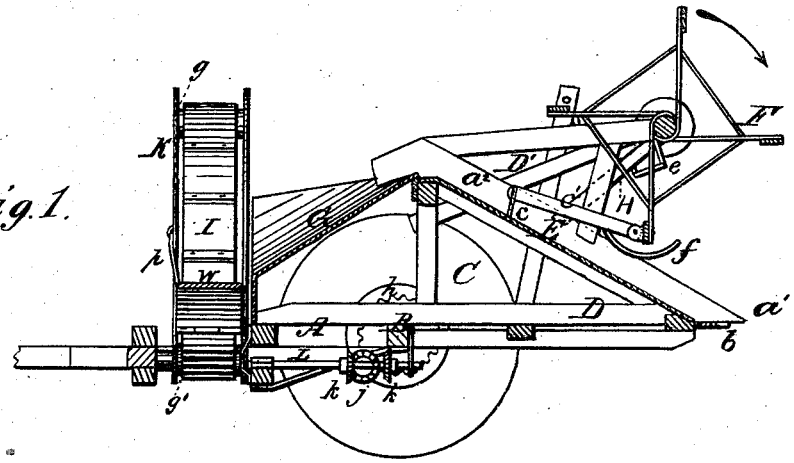
Figure 2:
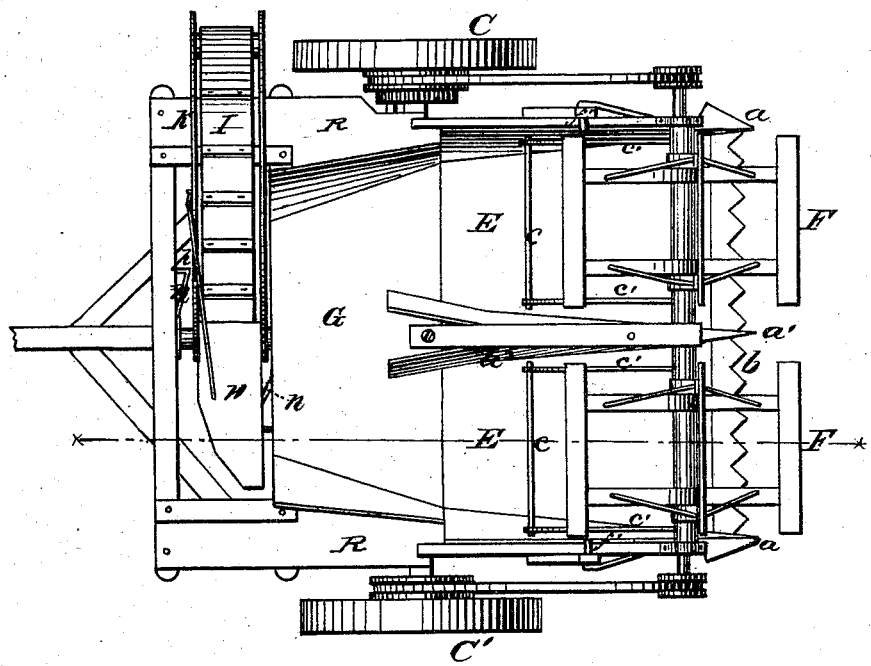

Figure 1 of the drawing is a side view. Fig. 2 is a top view. Fig. 3 is a bottom view; and Figs. 4, 5, and 6 are details.

The nature of my invention consists in combining a rake with each reel, which rake is actuated by means of cams and a tripping device so that the cut grain will be pushed up the inclined platform and delivered into an inclined chute, as will be hereinafter explained. Also, in combining with a laterally-reversible inclined elevator two cams and shifting-gearing, whereby the movements of the elevating-belt are automatically reversed when the elevator is changed from one side to the other of the machine.

In the annexed drawing, A designates the main frame, and B the axle, of two transporting-wheels, C C'. At the front of the main frame a secondary frame, D, is constructed, to which is applied the cutting apparatus, and also two backwardly-inclined platforms, E E. This secondary frame D also supports reel-frames D', carrying two revolving reels, F F, which receive rotation from the wheels C C' by means of belts and pulleys. At the extremities of the cutting apparatus are two dividers, $a$ $a$, and at the middle of the length thereof is a pointed divider, $a^1$, terminating at its rear end in a dividing-ridge, $a^2$, between the two platforms E E. The sickle $b$ may be one continuous blade, or, if desired, two independently-moving blades may be employed; and as the grain is cut the central divider causes it to fall upon the two platforms. Each one of the reels F is provided with a vibrating rake for pushing the cut grain, from the platform over which it plays, back upon an inclined chute, G. Each rake $c$ is secured to the free ends of two arms, $c'$ $c'$, which are pivoted to one of the reel-bars. H designates a spring-catch, which radiates from the reel-axle, and which is adapted to engage with one of the rake-arms, $c'$, and hold the rake, after each stroke over the platform, until the rake is brought in a position for commencing a raking stroke, when a cam, $e$, will release the rake from its catch H and allow it to drop. When the rake completes its backward stroke a curved rod, $f$, on one of its arms will strike a pin, $f'$, on the reel-frame and cause the rake to swing forward and be held by the catch H. The chute G, into which the grain is delivered by the rakes, is constructed with converging sides, which cause the grain, as it descends in this chute, to be compressed into a comparatively small space, in which condition the grain falls upon a hinged wing, W, and is held in a position to be elevated by slats applied to an endless apron, I. The apron I passes around two rollers, $g$ $g'$, which are applied in a frame, K, having its bearing on a shaft, L, which shaft is arranged longitudinally, and is allowed to receive endwise motion. The lower roller $g'$, around which the belt I passes, is keyed on the shaft L, and receives rotation from the transporting-wheel C through the medium of a spur-wheel, $h$, a pinion, $h'$, and three bevel-wheels, $j$ $k$ $k$. The wheel $h$ is secured to the hub of the transporting-wheel C. The pinion $h'$ is secured on a transverse shaft, $l$, on the inner end of which the bevel-wheel $j$ is keyed. The two bevel-wheels $k$ $k$ are keyed on the longitudinal shaft L at such a distance apart that only one of them will engage with the wheel $j$ at a time. The elevator-frame K can be turned either to the right or left hand side of the main frame, for the purpose of delivering the grain into a wagon from either side of the machine, as circumstances may require. On opposite sides of the space in which the frame K vibrates, and secured to the frame A, are cams $n$ $n$, which will act on said frame and press the same with the shaft L forward or backward, as the said frame is adjusted, thereby changing the direction of rotation of the elevating-apron by shifting the spur-wheels $k$ $k$. The wings W W are hinged to the lower end of the frame K, and connected to this frame again by cords or chains $p$, so that when the frame is properly adjusted a wing, W, will assume a position for receiving the grain from the chute G, and holding the grain properly to be taken by the slats on the elevating-apron.

The machine which I have above described is designed for heading or topping, and also for reaping long grain.

It will be observed that the sides or ledges of the two inclined platforms E E converge from their lower to their upper ends; consequently the grain will be condensed by the rakes $c\ c$ during the act of moving it upon or into the chute G.

What I claim, and desire to secure by Letters Patent, is—

1. The combination, with the backwardly-converging platforms E E and revolving reels F, of the vibrating rakes $c$, actuated by means of cams $e$, curved rods $f$, and studs or pins $f'$, substantially as described.

2. The cams $n\ n$, combined with the laterally-vibrating grain-elevator and with the longitudinally-movable shaft L, carrying roller $g'$, and bevel-wheels $k\ k$, substantially in the manner and for the purpose described.

In testimony that I claim the above I have hereunto subscribed my name in the presence of two witnesses.

MILES K. LEWIS.

Witnesses:
R. A. BATTY,
FRANK S. LEWIS.